(12) United States Patent
Zhang

(10) Patent No.: US 12,224,620 B2
(45) Date of Patent: Feb. 11, 2025

(54) POWER SUPPLY CIRCUIT AND UNINTERRUPTIBLE POWER SUPPLY UPS SYSTEM

(71) Applicant: HUAWEI DIGITAL POWER TECHNOLOGIES CO., LTD., Shenzhen (CN)

(72) Inventor: Chuntao Zhang, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 17/570,662

(22) Filed: Jan. 7, 2022

(65) Prior Publication Data
US 2022/0131407 A1  Apr. 28, 2022

Related U.S. Application Data

(63) Continuation of application No. PCT/CN2020/098059, filed on Jun. 24, 2020.

(30) Foreign Application Priority Data

Jul. 9, 2019  (CN) .................. 201910615941.9

(51) Int. Cl.
H02J 9/06  (2006.01)
H02J 7/00  (2006.01)

(52) U.S. Cl.
CPC ............ *H02J 9/062* (2013.01); *H02J 7/0013* (2013.01); *H02J 7/0063* (2013.01); *H02J 2310/16* (2020.01)

(58) Field of Classification Search
CPC ......... H02J 9/062; H02J 7/0013; H02J 7/0063
See application file for complete search history.

(56) References Cited

U.S. PATENT DOCUMENTS 3,956,638 A     5/1976 Ahrens et al.
2005/0116547 A1*  6/2005 Lin ................. H02M 7/493
                                                    307/66
(Continued)

FOREIGN PATENT DOCUMENTS

CN     104682375 A     6/2015
CN     105098920 A     11/2015
(Continued)

OTHER PUBLICATIONS

Extended European Search Report issued in corresponding European Application No. 20836879.5, dated Oct. 27, 2022, pp. 1-9.
(Continued)

*Primary Examiner* — Daniel Cavallari
(74) *Attorney, Agent, or Firm* — HAUPTMAN HAM, LLP (57) ABSTRACT

Embodiments of this application provide a power supply circuit, including a first power conversion module, a plurality of battery banks, a first bus, and a second bus. A first wiring terminal of the first power conversion module is connected to the battery bank, a second wiring terminal of the first power conversion module is connected to the first bus and the second bus, and the first power conversion module is configured to: perform direct current to direct current (DC/DC) conversion on a current output by a corresponding battery bank, and output currents to the first bus and the second bus. In this application, a quantity of battery banks are set to be less than a quantity of inverters in a UPS system, so that costs are reduced.

20 Claims, 8 Drawing Sheets

(56) References Cited

U.S. PATENT DOCUMENTS

| | | |
|---|---|---|
| 2009/0072623 A1 | 3/2009 | Liao |
| 2011/0133560 A1 | 6/2011 | Yamashita et al. |
| 2016/0285307 A1 | 9/2016 | Wang et al. |
| 2017/0033594 A1 | 2/2017 | Rozman et al. |
| 2020/0140101 A1* | 5/2020 | Long .................... B64D 41/00 |
| 2021/0194275 A1* | 6/2021 | Lee .......................... H02J 3/32 |
| 2021/0376602 A1* | 12/2021 | Schulz .................... H02J 1/10 |

FOREIGN PATENT DOCUMENTS

| | | |
|---|---|---|
| CN | 105515167 A | 4/2016 |
| CN | 106233572 A | 12/2016 |
| CN | 107645196 A | 1/2018 |
| CN | 109950969 A | 6/2019 |
| CN | 110417081 A | 11/2019 |
| EP | 3035477 A1 | 6/2016 |
| EP | 3407449 A1 | 11/2018 |

OTHER PUBLICATIONS

International Search Report issued in corresponding International Application No. PCT/CN2020/098059, dated Sep. 28, 2020, pp. 1-10.

Chinese Office Action issued in corresponding Chinese Application No. 201910615941.9, dated Jul. 24, 2020, pp. 1-8.

* cited by examiner

POWER SUPPLY CIRCUIT AND UNINTERRUPTIBLE POWER SUPPLY UPS SYSTEM

CROSS-REFERENCE TO RELATED APPLICATIONS

This application is a continuation of International Application No. PCT/CN2020/098059, filed on Jun. 24, 2020, which claims priority to Chinese Patent Application No. 201910615941.9, filed on Jul. 9, 2019. The disclosures of the aforementioned applications are hereby incorporated by reference in their entireties.

BACKGROUND

An uninterruptible power supply (UPS) system is a device that continuously supplies power to load. The UPS system usually includes the following parts: a rectifier, an inverter, a battery bank, and a mains input. When mains input of the UPS system is normal, the mains input supplies power to the load by using the rectifier and the inverter. When the mains input of the UPS system is faulty, the battery bank supplies power stored in the UPS system to the load by using the inverter, to ensure normal output.

Figure 1:
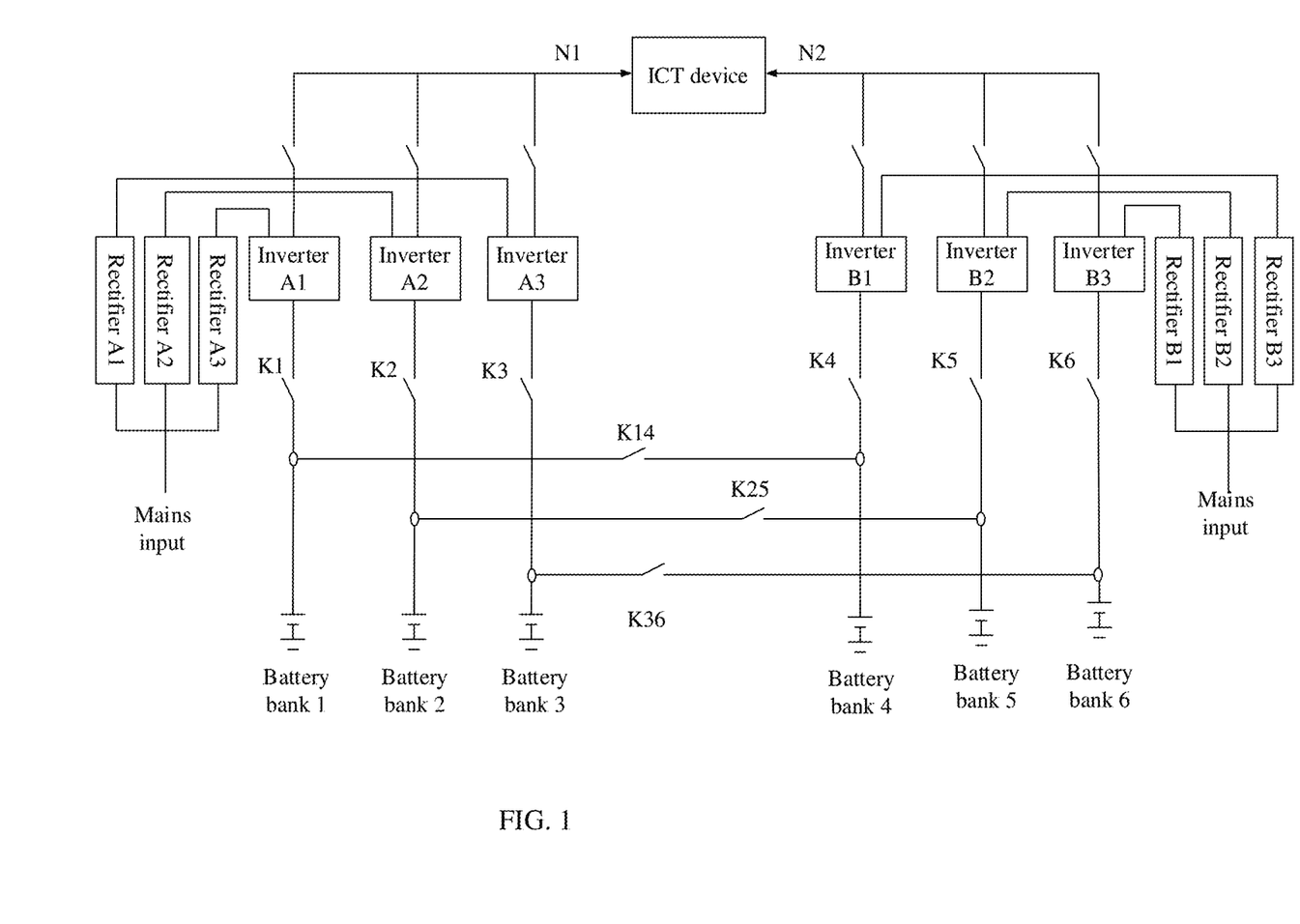
FIG. 1 is a schematic diagram of a structure of a power supply system.

In an existing technology, an information and communications technology (ICT) device is powered by using the UPS system, and to ensure reliability of power supply and power distribution of the ICT device, two power supply systems are generally used to supply power in a redundant backup manner. As shown in FIG. 1, when a mains input is abnormal, an inverter A1, an inverter A2, and an inverter A3 separately performs direct current to alternating current (DC/AC) conversion on currents output by a battery bank 1, a battery bank 2, and a battery bank 3, and supply power to an ICT device. An inverter B1, an inverter B2, and an inverter B3 are respectively backups of the inverter A1, the inverter A2, and the inverter A3. The battery bank 1 and the battery bank 4 are connected by using a switch K14. In a normal case, K14 is disconnected, the battery bank 1 supplies power to the inverter B1 by using K1, and the battery bank 4 supplies power to the inverter B1 by using K4. When the inverter A1 is faulty, K1 is disconnected. To prevent the battery bank 1 from being idle, K14 is closed. The battery bank 1 is connected in parallel to the battery bank 4 by using K14, to form a common battery bank, so that the common battery bank supplies power to the inverter B1 by using K4. Similarly, the battery bank 2 and the battery bank 5 are connected in parallel, and the battery bank 3 and the battery bank 6 are connected in parallel.

However, in a normal case, electric energy is provided for each inverter by using one battery bank. Therefore, a quantity of battery banks is unable to be less than a quantity of inverters. Because a quantity of inverters is relatively large, a corresponding quantity of battery banks is also large, and expensive.

SUMMARY

Embodiments of this application provide a power supply solution, including a power supply circuit, an uninterruptible power supply (UPS) system, and a power supply method. In one aspect, a quantity of battery banks are set to be less than a quantity of inverters in the UPS system, so that costs are reduced. In another aspect, power supply reliability of the UPS system is improved.

According to a first aspect, this application provides a power supply circuit. The power supply circuit is applied to an uninterruptible power supply (UPS) system, and the power supply circuit includes:
  a first power conversion module, a battery bank, a first bus, and a second bus; where
  a first wiring terminal of the power conversion module is connected to the battery bank, a second wiring terminal of the first power conversion module is connected to the first bus and the second bus, and the first power conversion module is configured to: perform direct current to direct current (DC/DC) conversion on a current output by the battery bank, and output currents to the first bus and the second bus.

In the foregoing manner, in one aspect, the first bus and the second bus are disposed, and because a power supply bus aggregates electric energy output by battery banks, a quantity of battery banks are less than a quantity of inverters in the UPS system, so that costs are reduced; and in another aspect, the first bus and the second bus are disposed, so that when either bus is faulty, electric energy is provided for the inverter by using the other bus, and therefore power supply reliability of the UPS system is improved.

In an optional design of the first aspect, the first power conversion module is further configured to: receive currents output by the first bus and the second bus, perform DC/DC conversion on the currents output by the first bus and the second bus, and supply power to the battery bank.

In this embodiment, the first bus and the second bus provides electric energy for a battery by using the first power conversion module, and no additional charging circuit, so that costs are reduced.

In an optional design of the first aspect, the first power conversion module is a bidirectional DC/DC converter.

According to a second aspect, this application provides an uninterruptible power supply (UPS) system, including:
  a first inverter circuit, a second inverter circuit, and a battery-powered circuit; where
  the battery-powered circuit includes:
  a first power conversion module, a battery bank, a first bus, and a second bus; where
  a first wiring terminal of the first power conversion module is connected to the battery bank, a second wiring terminal of the first power conversion module is connected to the first bus and the second bus, and the first power conversion module is configured to: perform DC/DC conversion on a current output by the battery bank, and output currents to the first bus and the second bus;
  the first bus is connected to a direct current input end of the first inverter circuit, and the first inverter circuit is configured to: perform DC/AC conversion on a current output by the first bus, and supply power to load; and
  the second bus is connected to a direct current input end of the second inverter circuit, and the second inverter circuit is configured to: perform DC/AC conversion on a current output by the second bus, and supply power to the load.

In an optional design of the second aspect, the second inverter circuit is configured to: when a path from the first inverter to the load is faulty, perform DC/AC conversion on the current output by the second bus, and supply power to the load.

In this embodiment of this application, because a second inverter (a secondary inverter) and a first inverter 304a or b, collectively referred to as first inverter 304, (a non-secondary inverter) are connected to different power supply buses, when the first bus is faulty, the first inverter is unable to supply power to the load normally, but a case in which the secondary inverter (the second inverter) of the first inverter is unable to supply power to the load does not appear, so that power supply reliability of the UPS system is improved.

In an optional design of the second aspect, the first power conversion module is further configured to: receive currents output by the first bus and the second bus, perform DC/DC conversion on the currents output by the first bus and the second bus, and supply power to the battery bank.

In an optional design of the second aspect, the first power conversion module is a bidirectional DC/DC converter.

In an optional design of the second aspect, the UPS system further includes a second power conversion module and a third power conversion module;
the second power conversion module is connected between the first bus and the direct current input end of the first inverter circuit, and the second power conversion module is configured to: perform DC/DC conversion on the current output by the first bus, and output a current to the direct current input end of the first inverter circuit;
the first inverter is configured to: perform DC/AC conversion on the current output by the second power conversion module, and supply power to the load;
the third power conversion module is connected between the second bus and the direct current input end of the second inverter circuit, and the third power conversion module is configured to: perform DC/DC conversion on the current output by the second bus, and output a current to the direct current input end of the second inverter circuit; and
the second inverter is configured to: perform DC/AC conversion on the current output by the third power conversion module, and supply power to the load.

According to a third aspect, this application provides a power supply method. The method is applied to a power supply circuit, and the power supply circuit includes:
a first power conversion module, a battery bank, a first bus, and a second bus; where
a first wiring terminal of the first power conversion module is connected to the battery bank, and a second wiring terminal of the first power conversion module is connected to the first bus and the second bus; and
the method includes:
performing, by the first power conversion module, DC/DC conversion on a current output by the battery bank, and outputting a current to the first bus and the second bus.

According to a fourth aspect, this application provides an uninterruptible power supply (UPS) power supply method. The method is applied to a UPS system, and the UPS system includes:
a first inverter circuit, a second inverter circuit, and a battery-powered circuit; where
the battery-powered circuit includes:
a first power conversion module, a battery bank, a first bus, and a second bus; where
a first wiring terminal of the first power conversion module is connected to the battery bank, and a second wiring terminal of the first power conversion module is connected to the first bus and the second bus;
the first bus is connected to a direct current input end of the first inverter circuit; and
the second bus is connected to a direct current input end of the second inverter circuit; and
the method includes:
performing, by the first power conversion module, DC/DC conversion on a current output by the battery bank, and outputting a current to the first bus and the second bus;
performing, by the first inverter circuit, DC/AC conversion on a current output by the first bus, and supplying power to load; and
performing, by the second inverter circuit, DC/AC conversion on a current output by the second bus, and supplying power to the load.

In the power supply solution provided in the embodiments of this application, in the foregoing manner, in one aspect, the first bus and the second bus are disposed, and because a power supply bus aggregates electric energy output by battery banks, a quantity of battery banks are less than a quantity of inverters in the UPS system, so that costs are reduced; and in another aspect, the first bus and the second bus are disposed, so that when either bus is faulty, electric energy is provided for the inverter by using the other bus, and therefore power supply reliability of the UPS system is improved.

DESCRIPTION OF EMBODIMENTS

The following describes embodiments of this application with reference to accompanying drawings. The described embodiments are merely some but not all of the embodiments of this application. Persons of ordinary skill in the art learn that, with development of technologies and emergence of new scenarios, the technical solutions provided in the embodiments of this application are also applicable to similar technical problems.

In the specification, claims, and accompanying drawings of this application, the terms "first", "second", and the like are intended to distinguish between similar objects but do not indicate an order or sequence. Data used in such a way are interchangeable in proper circumstances, so that the embodiments described herein is implemented in an order other than orders illustrated or described herein. Moreover, the terms "include", "contain" and any other variants mean to cover the non-exclusive inclusion, for example, a process, method, system, product, or device that includes a list of steps or modules is not limited to those steps or modules, but includes other modules not expressly listed or inherent to such a process, method, system, product, or device. Naming or numbering of steps in this application does not mean that steps in a method procedure are performed according to a time/logical sequence indicated by the naming or the numbering. An execution sequence of steps in a procedure that have been named or numbered are changed based on a technical objective to be implemented, provided that a same or similar technical effect is achieved.

Figure 2:
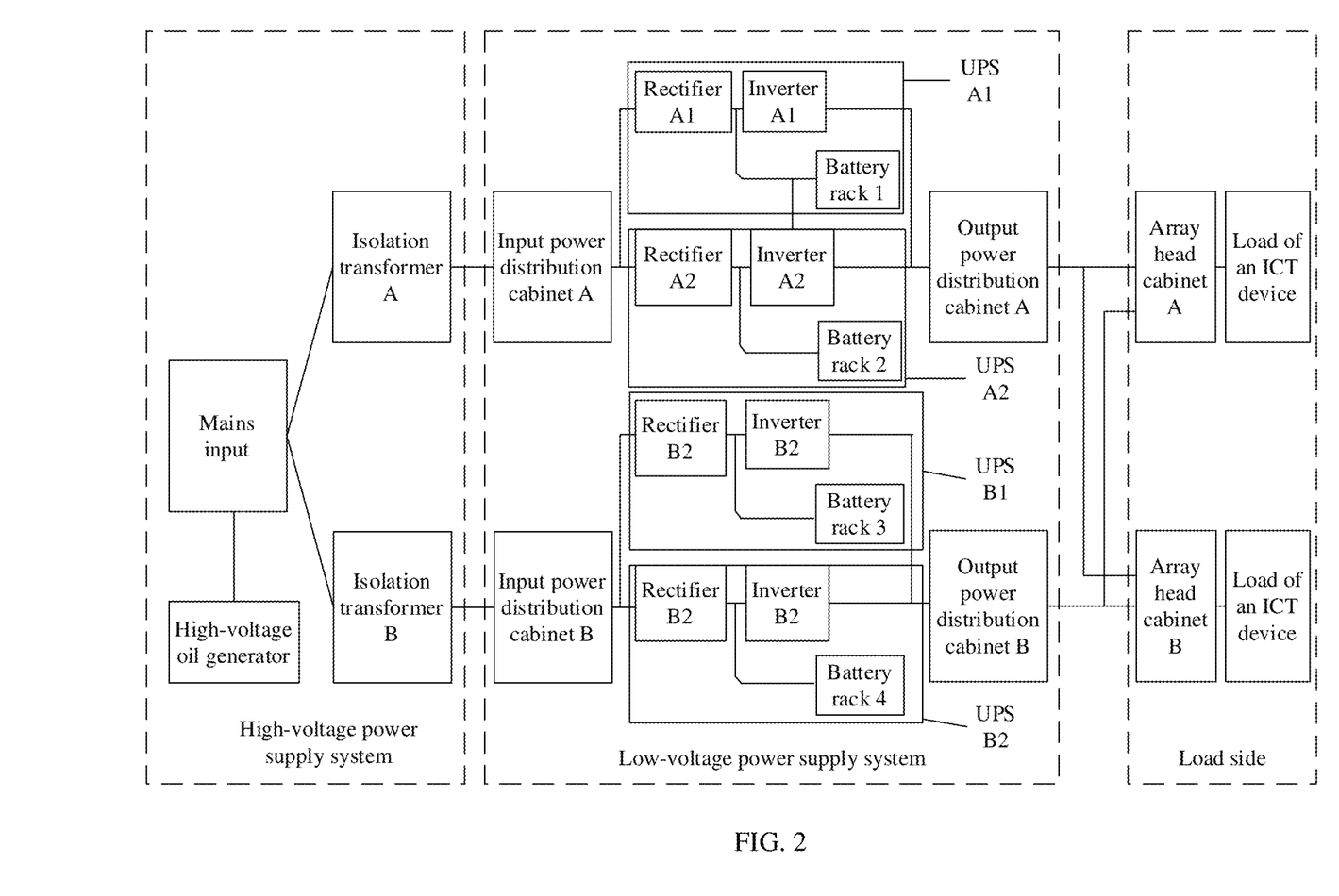
FIG. 2 is a schematic diagram of a power supply method of a data center (or an equipment room)

FIG. 2 is a schematic diagram of a power supply method of an existing data center (or equipment room). A quantity of UPSs in FIG. 2 is merely an example, and a quantity of UPSs in an actual application are selected based on a design parameter, and is not limited herein.

An alternating current power supply mode is used in the existing data center (or equipment room). To ensure power supply and power distribution reliability of a device in the entire data center, two power supply systems are used to supply power in a redundant backup manner. Refer to FIG. 2. A high-voltage power supply system includes two mains inputs, a generator input, and two branch outputs (a branch A and a branch B). The branch B is a backup of the branch A. The branch A is input to a UPS A1 and a UPS A2 in the equipment room after passing through an isolation transformer A and an input power distribution cabinet A, and the branch B is input to a UPS B1 and a UPS B2 in the equipment room by using an isolation transformer B and an input power distribution cabinet B.

If an output of the input power distribution cabinet A is normal, and a rectifier A1 and a rectifier A2 work normally, the rectifier A1 and the rectifier A2 use an output of the input power distribution cabinet B as an electric energy source. Direct current (DC) to alternating current (AC) conversion is performed by using the rectifiers, and then alternating current to direct current AC/DC conversion is performed by using the inverters. Output alternating currents separately pass through an output power distribution cabinet A and a power distribution cabinet A, and are input to an ICT device cabinet in the equipment room to supply power to load of an ICT device.

If the output of the input power distribution cabinet A is abnormal, but the inverter A1 and the inverter A2 work normally, a battery bank 1 (deployed on a battery rack 1) is connected to a direct current input end of the inverter A1. After performing direct current to alternating current DC/AC conversion by using the battery bank 1 as an electric energy source, the inverter A1 outputs an alternating current to the power distribution cabinet A, and inputs the alternating current to the ICT device cabinet in the equipment room through the power distribution cabinet A, to supply power to the load of the ICT device.

If a power supply path between the battery bank 1 and the load of the ICT device is faulty, as a backup of the UPS A1, the UPS B1 outputs an alternating current, and the alternating current separately passes through an output power distribution cabinet B and a power distribution cabinet B, and is input to the ICT device cabinet in the equipment room to supply power to the load of the ICT device.

However, a status of the battery bank and a status of a battery used as a secondary battery bank of the battery bank are different. Because values of output voltages are different, battery banks is unable to be connected in parallel. In addition, each UPS corresponds to one battery bank. When there are 2N UPSs (N UPSs are secondary UPSs), 2N battery banks are also used to provide electric energy. When there are a relatively large quantity of UPSs, a quantity of battery banks is relatively large, and expensive.

Figure 3A:
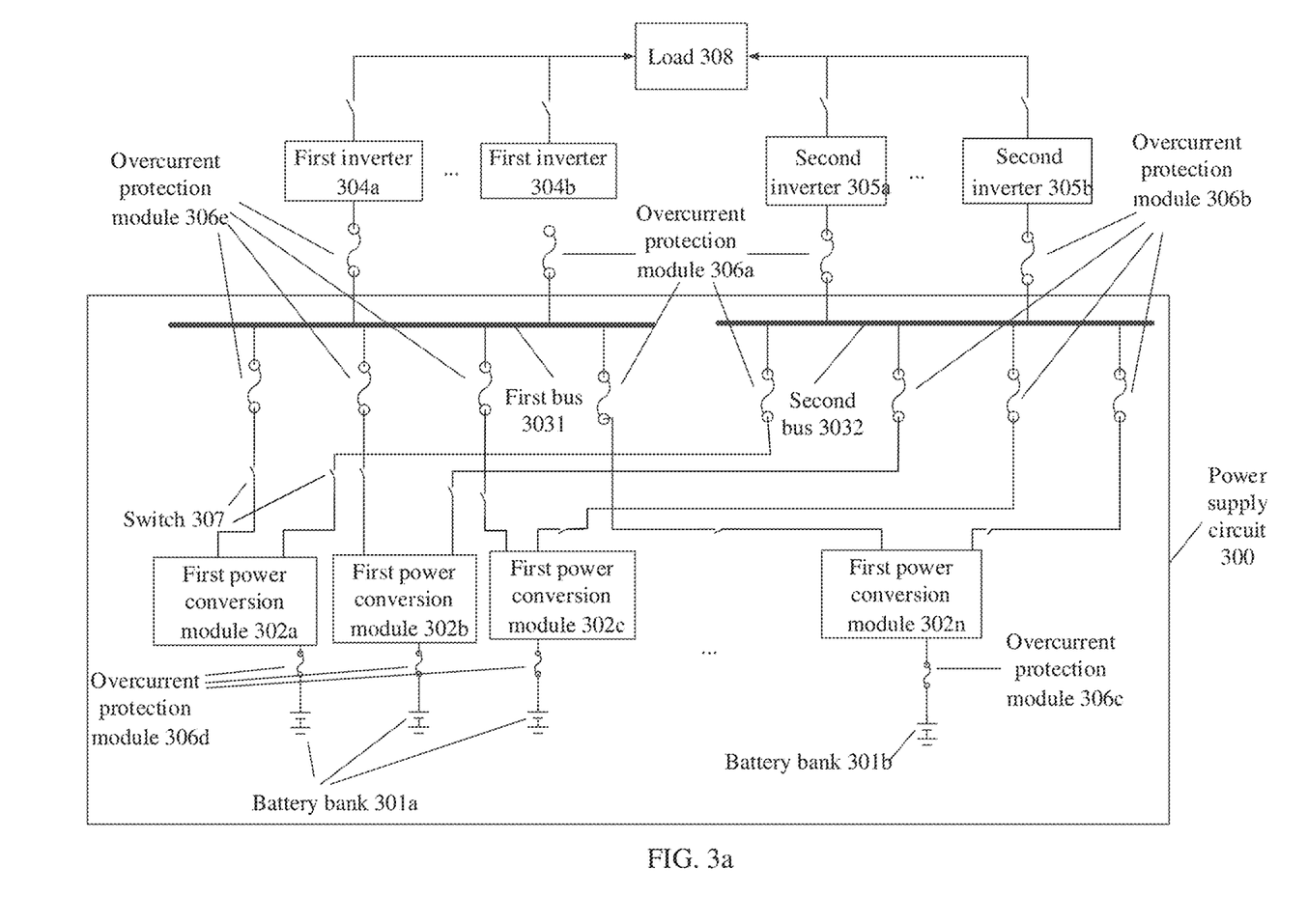
FIG. 3a is a schematic diagram of a structure of a power supply circuit according to an embodiment of this application.

To resolve the foregoing technical problem, an embodiment of this application provides a power supply circuit 300, and the power supply circuit 300 is applied to an uninterruptible power supply (UPS) system. FIG. 3a is a schematic diagram of a structure of a power supply circuit 300 according to an embodiment of this application. As shown in FIG. 3a, the power supply circuit 300 includes a plurality of first power conversion modules 302a-302n, collectively referred to as first power conversion modules 302, a plurality of battery banks 301a and 301b, collectively referred to as battery banks 301, a first bus 3031a or 3031b, collectively referred to as first bus 3031, and a second bus 3032. In addition, the power supply circuit 300 further includes a plurality of switches 307 and a plurality of overcurrent protection modules 306.

In this embodiment of this application, the first power conversion module 302 is deployed in a current balancing cabinet, and is disposed on a same battery rack together with a corresponding battery bank 301. The power supply circuit 300 provided in this embodiment of this application is applied to a scenario corresponding to FIG. 2. The first power conversion module 302 and the battery bank 301 is deployed on a battery rack (for example, a battery rack 1, a battery rack 2, a battery rack 3, or a battery rack 4) in FIG. 2.

The first bus 3031 and the second bus 3032 is deployed in a current combining cabinet. The first bus 3031 and the second bus 3032 is deployed on a path between a battery rack and an inverter in FIG. 2. In an embodiment, the current combining cabinet is added to the path between the battery rack and the inverter, and the first bus 3031 and the second bus 3032 are disposed in the current combining cabinet.

As shown in FIG. 3a, a first wiring terminal of the first power conversion module 302 is connected to the battery bank 301, a second wiring terminal of the first power conversion module 302 is connected to the first bus 3031 and the second bus 3032, and the first power conversion module 302 is configured to: perform direct current to direct current (DC/DC) conversion on a current output by the corresponding battery bank 301, and output currents to the first bus 3031 and the second bus 3032.

In this embodiment of this application, the first power conversion module 302 is a DC/DC converter. The first wiring terminal of the first power conversion module 302 receives a current output by the battery bank 301, and perform DC/DC conversion on the current output by the battery bank 301, to change a voltage value of the current output by the battery bank 301 and output a current.

Another module such as the overcurrent protection module 306 is connected between the first power conversion module 302 and the battery bank 301, and the overcurrent protection module 306 is a fuse, a circuit breaker, or the like. When a current output by the battery bank 301 is excessively large due to a fault of the battery bank 301, the overcurrent protection module 306 disconnects a path between the first power conversion module 302 and the battery bank 301.

Because a second wiring terminal of each of the plurality of first power conversion modules 302 in this embodiment of this application is connected to the first bus 3031 and the second bus 3032, the plurality of first power conversion modules 302 performs DC/DC conversion on a current output by the corresponding battery bank 301, and output currents with a same voltage to the first bus 3031 and the second bus 3032. In other words, voltage values of currents output by any two of the plurality of first power conversion modules 302 to the first bus 3031 and the second bus 3032 are the same.

In this embodiment of this application, the first power conversion module 302 performs DC/DC conversion on the current output by the battery bank 301, so that voltage values of currents output by the plurality of first power conversion modules 302 is controlled to be equal. In this way, the first bus 3031 and the second bus 3032 is also connected even if output voltages of the plurality of battery banks 301 are different.

In this embodiment of this application, the first bus 3031 and the second bus 3032 combines currents output by the battery banks 301, and output a direct current to an inverter in the UPS system.

Compared with an existing technology in which each inverter corresponds to one battery bank, in this embodiment of this application, power supply buses (the first bus and the second bus) are disposed, and because the power supply buses combine electric energy output by the plurality of battery banks, to dispose one battery bank for each inverter is avoidable, and the power supply bus are used as a common "power source", so that a quantity of battery banks are less than a quantity of inverters.

The first bus are connected to one or more first inverters 304, and the second bus are connected to one or more second inverters 305a-305d, collectively referred to as second inverters 305. In this embodiment of this application, a direct current input end of the first inverter 304 is connected to the first bus 3031, and an alternating current output end of the first inverter 304 is connected to load 308, to perform DC/AC conversion on a direct current output by the first bus 3031, and provide electric energy for load 305. A direct current input end of the second inverter 305 is connected to the second bus 3032, and an alternating current output end of the second inverter 305 is connected to the load 308, to perform DC/AC conversion on a direct current output by the second bus 3032, and provide electric energy for the load 305.

Optionally, the second inverter 305 is a backup of the first inverter 304. When the first inverter 304 works abnormally, a path between the abnormal first inverter 304 and the load 308 is disconnected. In this case, the corresponding second inverter 305 replaces the abnormal first inverter 304 to supply power to the load 308.

In this embodiment of this application, because the second inverter 305 (a secondary inverter) and the first inverter 304 (a non-secondary inverter) are connected to different power supply buses, when the first bus 3031 is faulty, the first inverter is unable to supply power to the load 308 normally, but a case in which the secondary inverter (the second inverter 305) of the first inverter is unable to supply power to the load 308 does not appear, so that power supply reliability of the UPS system is improved.

In this embodiment of this application, the overcurrent protection module 306 is connected between the first bus 3031 and the first power conversion module 302, between the second bus 3032 and the first power conversion module 302, between the first bus 3031 and the first inverter 304, and between the second bus 3032 and the second inverter 305. The overcurrent protection module 306 is a fuse, a circuit breaker, or the like.

When the first bus 3031 is faulty, the overcurrent protection module 306 disconnects a path between the first bus 3031 and the first power conversion module 302 and a path between the first bus 3031 and the first inverter 304. When the second bus 3032 is faulty, the overcurrent protection module 306 disconnects a path between the second bus 3032 and the first power conversion module 302 and a path between the second bus 3032 and the second inverter 305.

A switch 307 is further connected between the first power conversion module 302 and the first bus 3031. When the overcurrent protection module 306 between a power conversion module 302 and the first bus 3031 is disconnected, the switch 307 is further disconnected, to isolate the first bus 3031 and the first power conversion module 302.

In this embodiment of this application, when the first bus 3031 is faulty, the battery bank 301 inputs a current to the second bus 3032 by using the power conversion module 302.

In this embodiment of this application, when the second bus 3032 is faulty, the battery bank 301 inputs a current to the first bus 3031 by using the power conversion module 302.

In this embodiment of this application, the first bus and the second bus are disposed, so that when either of the buses is faulty, electric energy is also provided for the inverter by using the other bus, so that power supply reliability of the UPS system is improved.

In this embodiment of this application, there is more than two buses. This is not limited in this application.

Figure 3B:
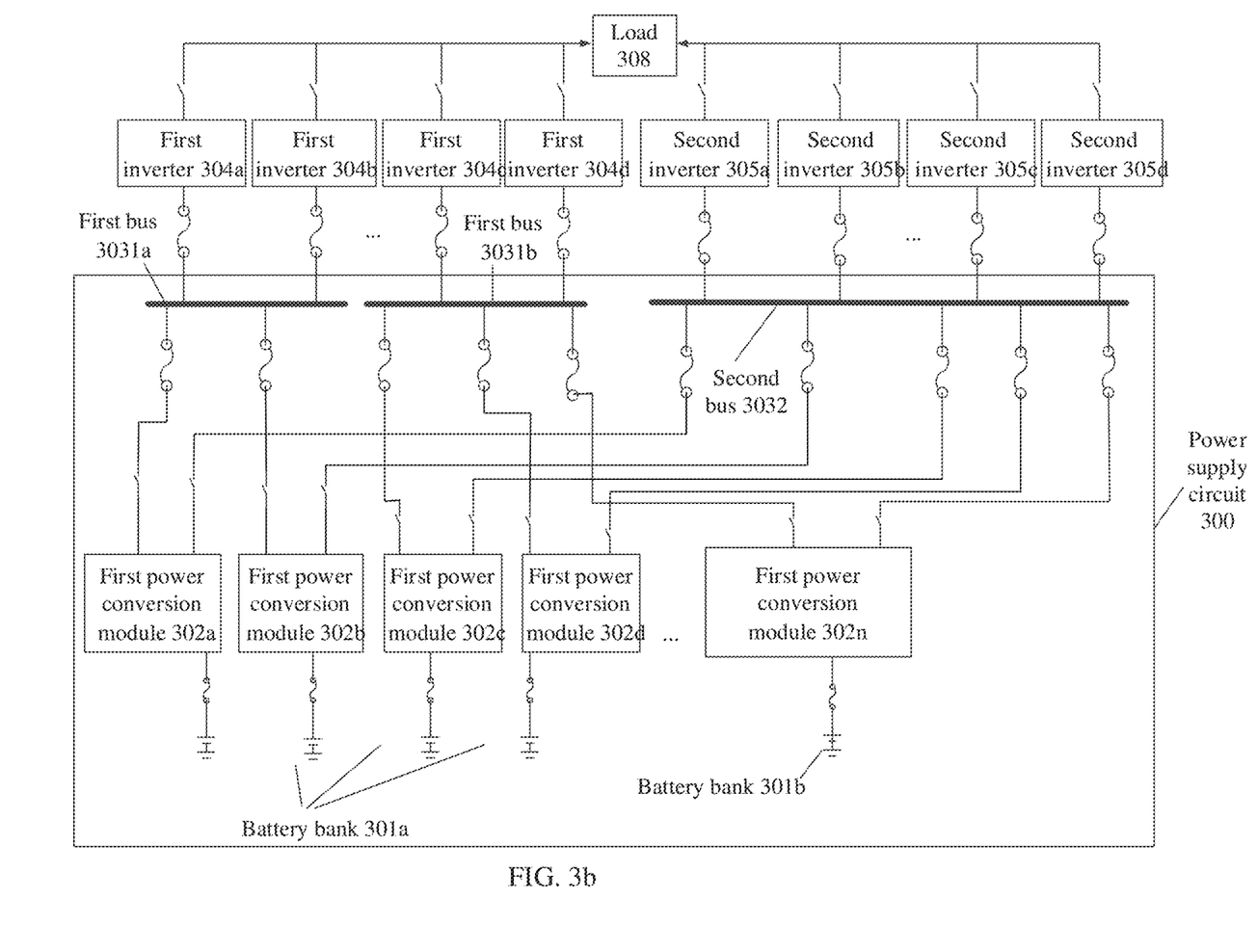
FIG. 3b is a schematic diagram of a structure of another power supply circuit according to an embodiment of this application.

FIG. 3b is a schematic diagram of a structure of a power supply circuit 300 according to an embodiment of this application. As shown in FIG. 3b, there is a plurality of first buses 3031.

In another scenario, a quantity of second buses is also set to a plural form. This is not limited herein.

An embodiment of this application provides a power supply circuit 300, including a first power conversion module 302, a battery bank 301, a first bus 3031, and a second bus 3032. A first wiring terminal of the first power conversion module 302 is connected to the battery bank 301, a second wiring terminal of the first power conversion module 302 is connected to the first bus 3031 and the second bus 3032, and the first power conversion module 302 is configured to: perform direct current to direct current (DC/DC) conversion on a current output by the corresponding battery bank 301, and output currents to the first bus 3031 and the second bus 3032. In the foregoing manner, in one aspect, the first bus and the second bus are disposed, and because a power supply bus aggregates electric energy output by battery banks 301, a quantity of battery banks are less than a quantity of inverters in a UPS system, so that costs are reduced; and in another aspect, the first bus and the second bus are disposed, so that when either bus is faulty, electric energy is provided for the inverter by using the other bus, and therefore power supply reliability of the UPS system is improved.

Figure 4:
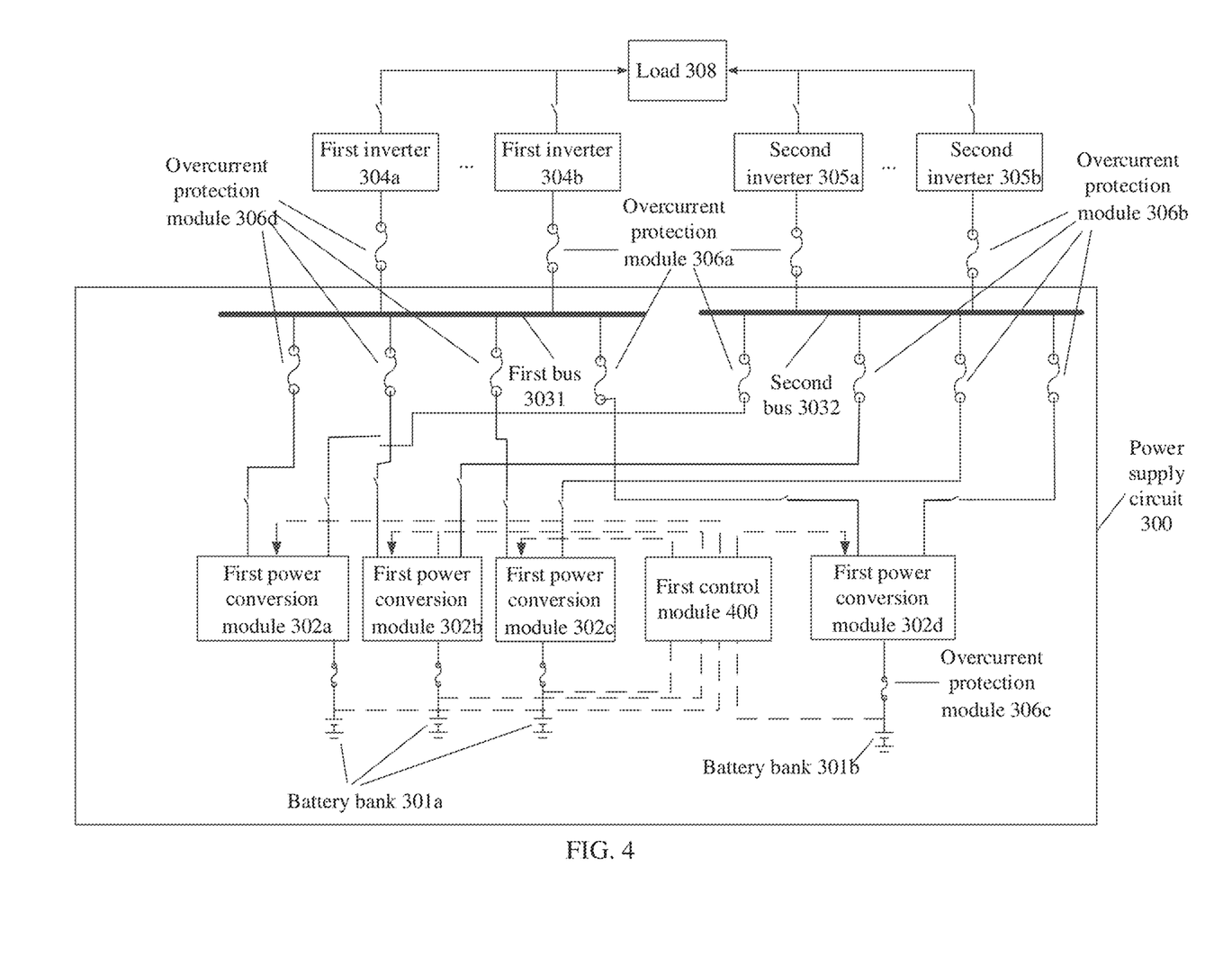
FIG. 4 is a schematic diagram of a structure of another power supply circuit according to an embodiment of this application.

FIG. 4 is a schematic diagram of a structure of another power supply circuit 300 according to an embodiment of this application. As shown in FIG. 4, different from the embodiments corresponding to FIG. 3a and FIG. 3b, in this embodiment, the power supply circuit 300 further includes a control circuit 400.

In this embodiment of this application, one end of the control circuit 400 is connected to an output end of the battery bank 301, and the other end of the control circuit 400 is connected to the second wiring terminal of the first power conversion module 302.

In this embodiment of this application, the control circuit 400 is configured to: obtain a plurality of output voltage values of a plurality of battery banks 301, and send a control signal to a third wiring terminal of the first power conversion module 302 based on the plurality of output voltage values of the plurality of battery banks 301, so that the first power conversion module 302 controls, based on the control signal, a voltage value of a current output by the second wiring terminal.

In this embodiment of this application, a sampling component (for example, a voltage transformer) is disposed at an output end of the battery bank 301, to obtain an output voltage value of the battery bank 301 through sampling.

Optionally, the output voltage value of the battery bank 301 is obtained through centralized sampling in a centralized sampling manner, for example, by using a digital signal processing (DSP) technology.

In this embodiment of this application, the third wiring terminal of the first power conversion module 302 is a control signal input end of the power conversion module.

In an embodiment, the first power conversion module 302 adjusts, based on the control signal, a duty ratio of an output current of a switching component included in the first power conversion module 302, to control a voltage value of the output current.

In an embodiment, the control circuit 400 obtains a plurality of output voltage values of a plurality of battery banks 301, and determine an average value V1 of the plurality of output voltage values as a target voltage value, to send a control signal to third wiring terminals of a plurality of first power conversion module 302, so that the plurality of first power conversion module 302 controls, based on the control signal, voltage values of currents output by second wiring terminals to be V1.

In an embodiment, the control circuit 400 obtains a plurality of output voltage values of a plurality of battery banks 301, and determine a maximum voltage value V2 in the plurality of output voltage values as a target voltage value, to send a control signal to third wiring terminals of a plurality of first power conversion module 302, so that the plurality of first power conversion module 302 controls, based on the control signal, voltage values of currents output by second wiring terminals to be V2.

In an embodiment, the control circuit 400 obtains a plurality of output voltage values of a plurality of battery banks 301, and determine a minimum voltage value V3 in the plurality of output voltage values as a target voltage value, to send a control signal to third wiring terminals of a plurality of first power conversion module 302, so that the plurality of first power conversion module 302 controls, based on the control signal, voltage values of currents output by second wiring terminals to be V3.

In another embodiment of this application, the control circuit 400 is further configured to: obtain a plurality of output current values of a plurality of battery banks 301, and send a control signal to a third wiring terminal of the first power conversion module 302 based on the plurality of output current values of the plurality of battery banks 301, so that the first power conversion module 302 controls, based on the control signal, a current value of a current output by the second wiring terminal.

Due to an individual difference of battery banks, a conductive impedance difference is relatively large, or due to a difference in a quantity of batteries in the battery bank, a state of capacity (SOC) of a battery, or a state of health (SOH) of a battery, currents output by battery banks connected in parallel are not balanced. In addition, because conductive impedance is a negative temperature coefficient characteristic, a battery bank with a large current eventually bears the currents and consequently is disconnected or is faulty and damaged.

In this embodiment of this application, the first power conversion module 302 controls a current value of the output current based on the control signal sent by the control circuit 400, to implement output current balancing or proportional current splitting of the battery bank.

In an embodiment, the first power conversion module 302 controls, based on the control signal sent by the control circuit 400, a conduction angle of the switching component included in the first power conversion module 302, to control the current value of the output current. For example, for a unidirectional sine wave, a conduction angle during full-cycle conduction is 180 degrees.

In another embodiment of this application, the first power conversion module 302 is a bidirectional power conversion module. For example, the first power conversion module 302 is a bidirectional DC/DC converter.

In this embodiment of this application, the first power conversion module 302 is further configured to: receive currents output by the first bus 3031 and the second bus 3032, perform DC/DC conversion on the currents output by the first bus 3031 and the second bus 3032, and charge the battery bank 301.

When the battery bank 301 is charged, the first power conversion module 302 receives the currents output by the first bus 3031 and the second bus 3032. In this case, the first power conversion module 302 performs DC/DC conversion on the currents output by the first bus 3031 and the second bus 3032, and adjust voltage values of the currents to a charging voltage configured to be used to charge the battery bank 301.

In another embodiment of this application, the first power conversion module 302 includes: a first unidirectional discharging module and a first unidirectional charging module. The first unidirectional discharging module and the first unidirectional charging module are connected in parallel and then coupled between the first bus and the battery bank and between the second bus and the battery bank. The first unidirectional discharging module is configured to perform DC/DC conversion on a current output by the battery bank, and output currents to the first bus and the second bus. The first unidirectional charging module is configured to receive the currents output by the first bus and the second bus, perform DC/DC conversion on the currents, and charge the battery bank.

Optionally, the first unidirectional discharging module and the first unidirectional charging module is unidirectional DC/DC converters.

In this embodiment, the power supply circuit 300 includes a transmitter, at least one processor, a memory, a communications bus, and a sampling module. The at least one processor and the memory are connected by using the communications bus and communicate with each other.

The communications bus are an RS485 bus, an RS232 bus, a controller area network (CAN) bus, or the like. Alternatively, the communications bus 404 is an industry standard architecture (ISA) bus, a peripheral component interconnect (PCI) bus, an extended industry standard architecture (EISA) bus, or the like. The bus are classified into an address bus, a data bus, a control bus, and the like.

The memory is configured to store executable program code, where the program code includes computer operation instructions. The memory includes a high-speed RAM memory, and further includes a non-volatile memory (non-volatile memory), for example, at least one disk memory.

The processor is configured to execute the executable program code stored in the memory. The processor is a central processing unit (CPU), an application specific integrated circuit (ASIC), or one or more integrated circuits configured to implement this embodiment of this application.

The sampling module is configured to obtain output voltage values of the plurality of battery banks 301.

The processor is configured to generate a control signal based on the output voltage values of the plurality of battery banks 301.

The transmitter is configured to send the control signal to third wiring terminals of the plurality of first power conversion modules 302, so that the first power conversion module 302 controls, based on the control signal, a voltage value of a current output by the second wiring terminal.

In an embodiment, the sampling module is further configured to obtain output current values of the plurality of battery banks 301.

The processor is configured to generate a control signal based on the output current values of the plurality of battery banks 301.

The transmitter is configured to send the control signal to third wiring terminals of the plurality of first power conversion modules 302, so that the plurality of first power conversion modules 302 control, based on the control signal, current values of currents output by second wiring terminals.

Figure 5A:
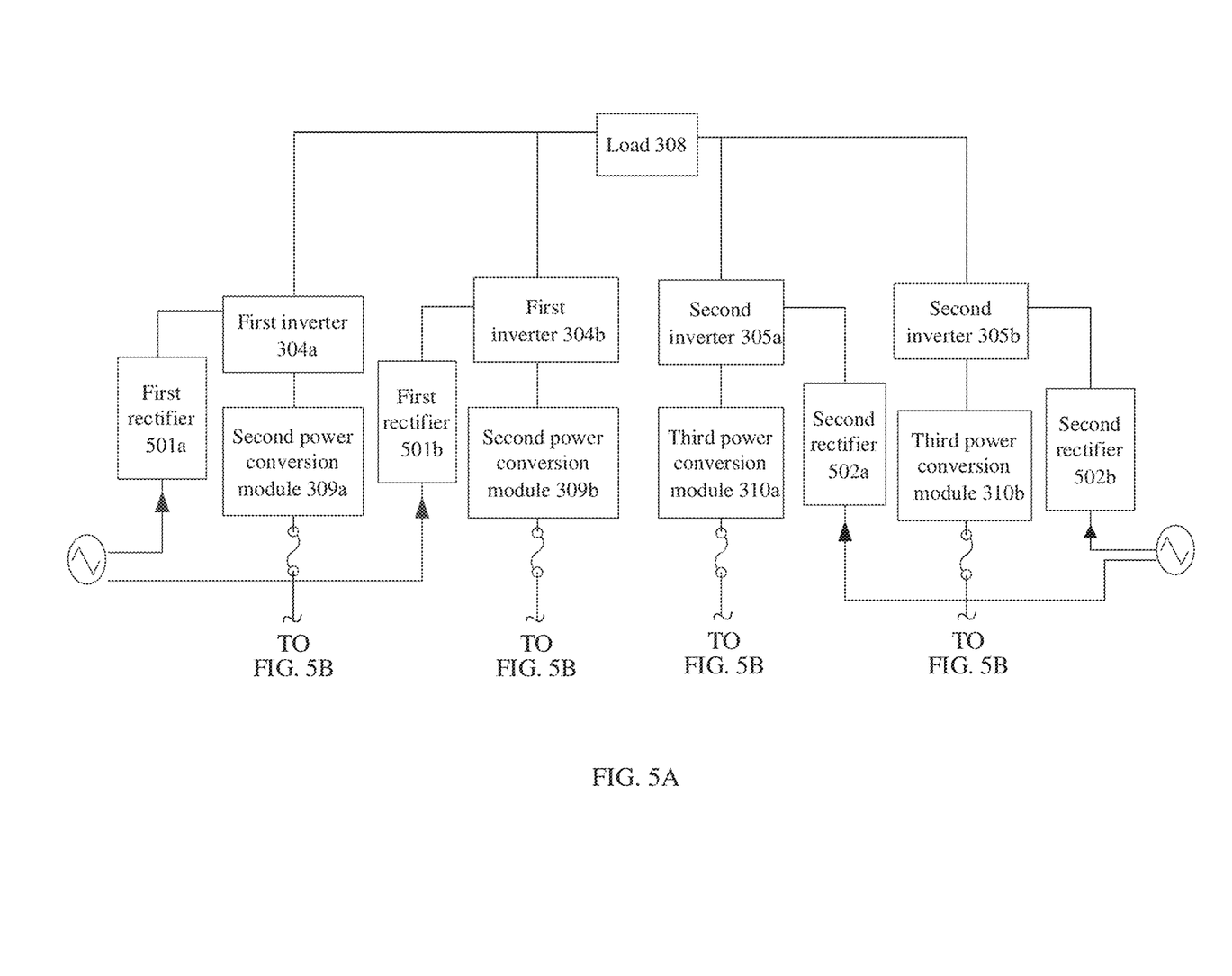
FIG. 5A and FIG. 5B are a schematic diagram of a structure of an uninterruptible power supply (UPS) system according to an embodiment of this application.
Figure 5B:
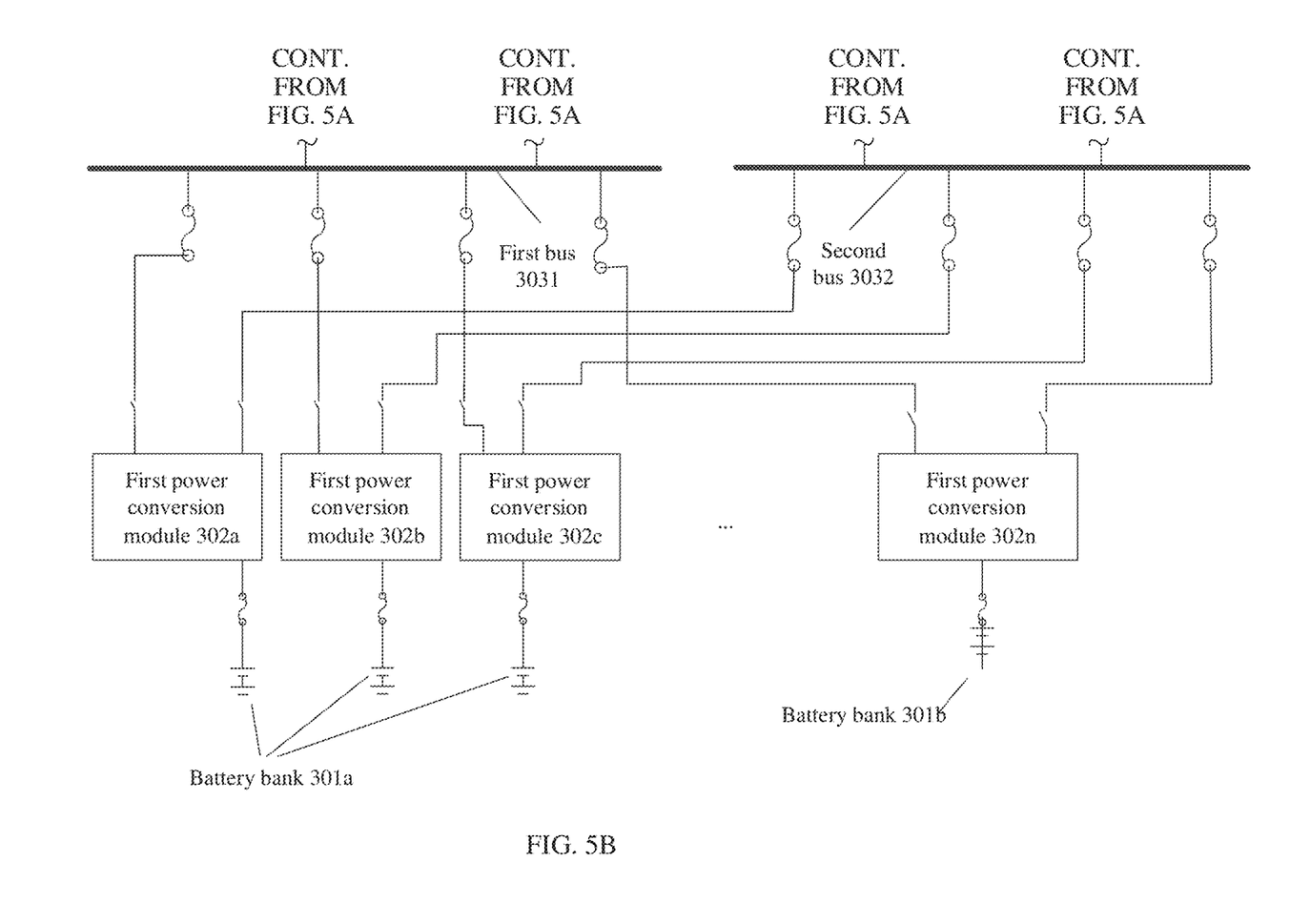

FIG. 5A and FIG. 5B are a schematic diagram of a structure of a UPS system according to an embodiment of this application. For descriptions of a first bus 3031, a second bus 3032, a first power conversion module 302, and a battery bank 301, refer to the descriptions in the foregoing embodiments. This is not limited herein.

In this embodiment of this application, a first rectifier 501*a* and 501*b*, collectively referred to as first rectifier 501, performs DC/AC conversion on an alternating current of a mains input, and then a first inverter 304 performs AC/DC conversion on a direct current output by the first rectifier 501, and supplies power to load 308. If the mains input is abnormal, a second power conversion module 309*a* and 309*b*, collectively referred to as second power conversion module 309, receives a direct current output by the first bus 3031, and performs DC/DC conversion on the direct current output by the first bus 3031, and then the first inverter 304 performs DC/AC conversion on a direct current output by a bidirectional DC/DC converter, namely, the second power conversion module 309, and supplies power to load 308.

In this embodiment of this application, the second power conversion module 309 is a bidirectional DC/DC converter, and the second power conversion module 309 boosts a voltage of a direct current output by the first bus 3031.

When a power supply path from the first bus 3031 to the first inverter 304 is faulty, a second rectifier 502*a* and 502*b*, collectively referred to as second rectifier 502, performs DC/AC conversion on the alternating current of the mains input, and then the second inverter 305 performs AC/DC conversion on a direct current output by the second rectifier 502, and supplies power to the load 308. If the mains input is abnormal, a third power conversion module 310*a* or 310*b*, collectively referred to as third power conversion module 310, receives a direct current output by the second bus 3032, and performs DC/DC conversion on the direct current output by the second bus 3032, and then the second inverter 305 performs DC/AC conversion on a direct current output by the third power conversion module 310, and supplies power to the load 308.

In this embodiment of this application, the third power conversion module 310 is a bidirectional DC/DC converter, and the third power conversion module 310 boosts a voltage of a direct current output by the second bus 3032.

Figure 6:
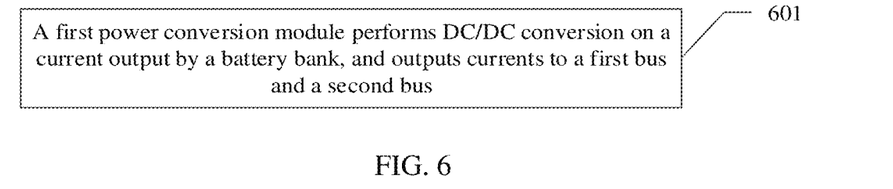
FIG. 6 is a schematic flowchart of an uninterruptible power supply method according to an embodiment of this application.

A power supply method provided in an embodiment of this application is described below. FIG. 6 is a schematic flowchart of a power supply method according to an embodiment of this application. The method is applied to a power supply circuit, and the power supply circuit includes:
    a first power conversion module, a battery bank, a first bus, and a second bus.

A first wiring terminal of the first power conversion module is connected to the battery bank, and a second wiring terminal of the first power conversion module is connected to the first bus and the second bus.

The method includes:

For descriptions of the first power conversion module, the battery bank, the first bus, and the second bus, refer to the foregoing embodiments. Details are not described herein again.

The power supply method provided in this embodiment of this application includes the following steps.
    601: The first power conversion module performs DC/DC conversion on a current output by the battery bank, and outputs currents to the first bus and the second bus.

An embodiment of this application further provides an uninterruptible power supply (UPS) power supply method. The method is applied to a UPS system, and the UPS system includes:
    a first inverter circuit, a second inverter circuit, and a battery-powered circuit.

The battery-powered circuit includes:
    a first power conversion module, a battery bank, a first bus, and a second bus.

A first wiring terminal of the first power conversion module is connected to the battery bank, and a second wiring terminal of the first power conversion module is connected to the first bus and the second bus.

The first bus is connected to a direct current input end of the first inverter circuit.

The second bus is connected to a direct current input end of the second inverter circuit.

Figure 7:
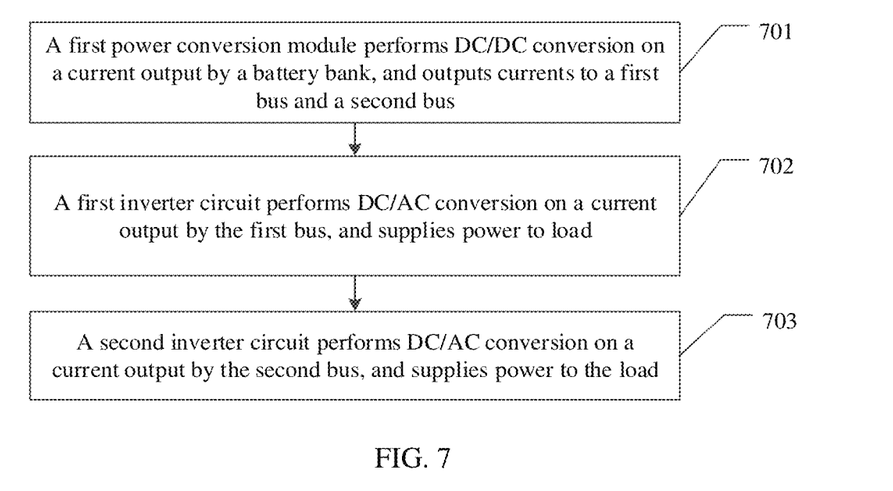
FIG. 7 is a schematic flowchart of another uninterruptible power supply method according to an embodiment of this application.

Refer to FIG. 7. The uninterruptible power supply (UPS) power supply method provided in this embodiment of this application includes the following steps:
    701: The first power conversion module performs DC/DC conversion on a current output by the battery bank, and outputs currents to the first bus and the second bus.
    702: The first inverter circuit performs DC/AC conversion on a current output by the first bus, and supplies power to load.
    703: The second inverter circuit performs DC/AC conversion on a current output by the second bus, and supplies power to the load.

For the purpose of convenient and brief description, persons skilled in the art understand, for a detailed working process of the foregoing system, apparatus, and unit, refer to a corresponding process in the foregoing method embodiments, and details are not described herein again.

In the several embodiments provided in this application, the disclosed system, apparatus, and method is implemented in another manner. For example, the described apparatus embodiment is merely an example. For example, division into units is merely logical function division and is other division during actual implementation. For example, a plurality of units or components are combined or integrated into another system, or some features are ignored or not performed. In addition, the displayed or discussed mutual coupling or direct coupling or communication connections are implemented through some interfaces. The indirect coupling or communication connections between the apparatuses or units are implemented in electrical, mechanical, or other forms.

The units described as separate parts is or is unable to be physically separate, and parts displayed as units is or is unable to be physical units, is located in one position, or is distributed on a plurality of network units. Some or all of the units are selected based on parameters to achieve the objectives of the solutions of the embodiments.

In addition, functional units in the embodiments of this application is integrated into one processing unit, or each of the units exists alone physically, or two or more units are integrated into one unit. The integrated unit is implemented in a form of hardware, or is implemented in a form of a software functional unit.

When the integrated unit is implemented in a form of a software functional unit and sold or used as an independent product, the integrated unit is stored in a computer-readable storage medium. Based on such an understanding, the technical solutions of this application, or the part contributing to the conventional technology, or all or some of the technical solutions are implemented in the form of a software product. The software product is stored in a storage medium and includes several instructions for instructing a computer device (which is a personal computer, a server, another network device) to perform all or some of the steps of the methods described in the embodiment in FIG. 2 of this application. The foregoing storage medium includes: any medium that stores program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art understand that persons of ordinary skill in the art still makes modifications to the technical solutions described in the foregoing embodiments or make equivalent replacements to some technical features thereof, without departing from the scope of the technical solutions of the embodiments of this application.

What is claimed is:

1. A power supply circuit applied to an uninterruptible power supply (UPS) system, comprises:
    a first power conversion module;
    a battery bank;
    a first bus;
    a second bus;
    a first wiring terminal of the first power conversion module being connected to the battery bank; and
    a second wiring terminal of the first power conversion module being connected to the first bus and the second bus; wherein:
    the first power conversion module is configured to:
        perform direct current to direct current (DC/DC) conversion on a current output by the battery bank;
        output a first current to the first bus;
        output a second current to the second bus, wherein the second current is receivable by the second bus without passing through the first bus;
        receive currents output by the first bus and the second bus, wherein the first power conversion module is configured to receive currents output by the second bus without the currents passing through the first bus; and
        supply power to the battery bank by performing direct current to direct current (DC/DC) conversion on the currents output by the first bus and the second bus.

2. The power supply circuit according to claim 1, further comprising an overcurrent protection module between the first power conversion module and the first bus.

3. The power supply circuit according to claim 1, wherein the first power conversion module is a bidirectional DC/DC converter.

4. An uninterruptible power supply (UPS) system, comprising:
    a first inverter circuit;
    a second inverter circuit; and
    a battery-powered circuit; wherein:
    the battery-powered circuit comprises:
        a first power conversion module;
        a battery bank;
        a first bus;
        a second bus; and
        a first wiring terminal of the first power conversion module being connected to the battery bank;
        a second wiring terminal of the first power conversion module being connected to the first bus and the second bus, and the first power conversion module is configured to:
            perform direct current to direct current (DC/DC) conversion on a current output by the battery bank;
            output a first current to the first bus; and
            output a second current to the second bus, wherein the second current is receivable by the second bus without passing through the first bus; and
        wherein the first bus is connected to a direct current input end of the first inverter circuit, and the first inverter circuit is configured to:
            perform direct current to alternating current (DC/AC) conversion on a current output by the first bus; and
            supply power to load; and
        wherein the second bus is connected to a direct current input end of the second inverter circuit, and the second inverter circuit is configured to:
            perform DC/AC conversion on a current output by the second bus; and
            supply power to the load.

5. The UPS system according to claim 4, wherein the second inverter circuit is configured to:
    in response to a path from the first inverter circuit to the load being faulty, perform DC/AC conversion on the current output by the second bus; and
    supply power to the load.

6. The UPS system according to claim 4, wherein the first power conversion module is further configured to:
    receive the currents output by the first bus and the second bus, wherein the first power conversion module is configured to receive currents output by the second bus without the currents passing through the first bus;
    perform DC/DC conversion on the currents output by the first bus and the second bus; and
    supply power to the battery bank.

7. The UPS system according to claim 5, wherein the first power conversion module is further configured to:
    receive the currents output by the first bus and the second bus;
    perform DC/DC conversion on the currents output by the first bus and the second bus; and
    supply power to the battery bank.

8. The UPS system according to claim 4, wherein the first power conversion module is a bidirectional DC/DC converter.

9. The UPS system according to claim 5, wherein the first power conversion module is a bidirectional DC/DC converter.

10. The UPS system according to claim 6, wherein the first power conversion module is a bidirectional DC/DC converter.

11. The UPS system according to any one of claim 4, further comprising:
- a second power conversion module; and
- a third power conversion module;
- wherein the second power conversion module being connected between the first bus and the direct current input end of the first inverter circuit, and the second power conversion module is configured to:
  - perform DC/DC conversion on the current output by the first bus; and
  - output a current to the direct current input end of the first inverter circuit;
- wherein the first inverter circuit is configured to:
  - perform direct current to alternating current (DC/AC) conversion on the current output by the second power conversion module; and
  - supply power to the load;
- wherein the third power conversion module is connected between the second bus and the direct current input end of the second inverter circuit; and
- the third power conversion module is configured to:
  - perform DC/DC conversion on the current output by the second bus; and
  - output a current to the direct current input end of the second inverter circuit; and
- the second inverter circuit is configured to:
  - perform DC/AC conversion on the current output by the third power conversion module; and
  - supply power to the load.

12. The UPS system according to claim 5, further comprising:
- a second power conversion module; and
- a third power conversion module;
- wherein the second power conversion module is connected between the first bus and the direct current input end of the first inverter circuit, and the second power conversion module is configured to:
  - perform DC/DC conversion on the current output by the first bus; and
  - output a current to the direct current input end of the first inverter circuit;
- wherein the first inverter circuit is configured to:
  - perform direct current to alternating current (DC/AC) conversion on the current output by the second power conversion module; and
  - supply power to the load;
- wherein the third power conversion module is connected between the second bus and the direct current input end of the second inverter circuit, and the third power conversion module is configured to:
  - perform DC/DC conversion on the current output by the second bus; and
  - output a current to the direct current input end of the second inverter circuit; and
- wherein the second inverter circuit is configured to:
  - perform DC/AC conversion on the current output by the third power conversion module; and
  - supply power to the load.

13. The UPS system according to claim 6, further comprising:
- a second power conversion module; and
- a third power conversion module;
- wherein the second power conversion module is connected between the first bus and the direct current input end of the first inverter circuit, and the second power conversion module is configured to:
  - perform DC/DC conversion on the current output by the first bus; and
  - output a current to the direct current input end of the first inverter circuit;
- wherein the first inverter circuit is configured to:
  - perform direct current to alternating current (DC/AC) conversion on the current output by the second power conversion module; and
  - supply power to the load;
- wherein the third power conversion module is connected between the second bus and the direct current input end of the second inverter circuit, and the third power conversion module is configured to:
  - perform DC/DC conversion on the current output by the second bus; and
  - output a current to the direct current input end of the second inverter circuit; and
- wherein the second inverter circuit is configured to:
  - perform DC/AC conversion on the current output by the third power conversion module; and
  - supply power to the load.

14. The UPS system according to claim 8, further comprises:
- a second power conversion module; and
- a third power conversion module;
- wherein the second power conversion module is connected between the first bus and the direct current input end of the first inverter circuit, and the second power conversion module is configured to:
  - perform DC/DC conversion on the current output by the first bus; and
  - output a current to the direct current input end of the first inverter circuit;
- wherein the first inverter circuit is configured to:
  - perform direct current to alternating current (DC/AC) conversion on the current output by the second power conversion module; and
  - supply power to the load;
- wherein the third power conversion module is connected between the second bus and the direct current input end of the second inverter circuit, and the third power conversion module is configured to:
  - perform DC/DC conversion on the current output by the second bus; and
  - output a current to the direct current input end of the second inverter circuit; and
- wherein the second inverter circuit is configured to:
  - perform DC/AC conversion on the current output by the third power conversion module; and
  - supply power to the load.

15. A power supply method, wherein the method is applied to a power supply circuit, and the power supply circuit comprises:
- a first power conversion module;
- a battery bank;
- a first bus;
- a second bus;
- a first wiring terminal of the first power conversion module is connected to the battery bank; and a second wiring terminal of the first power conversion module is connected to the first bus and the second bus; and the method comprises:
performing, by the first power conversion module, DC/DC conversion on a current output by the battery bank;

outputting a first current to the first bus;

outputting a second current to the second bus, wherein outputting the second current is received by the second bus without passing through the first bus;

receiving currents output by the first bus and the second bus, wherein the first power conversion module receives currents output by the second bus without the currents passing through the first bus; and supplying power to the battery bank by performing direct current to direct current (DC/DC) conversion on the currents output by the first bus and the second bus.

16. The power supply circuit according to claim 1, further comprising an overcurrent protection module between the first power conversion module and the second bus.

17. The power supply method according to claim 15, wherein the first bus is connected to a direct current input end of a first inverter circuit, and the method further comprising:

converting direct current to alternating current (DC/AC) on a current output by the first bus; and supplying power to a load.

18. The power supply method according to claim 17, wherein the second bus is connected to a direct current input end of a second inverter circuit, and the method further comprising:

converting DC to AC on a current output by the second bus; and supplying power to the load.

19. The power supply method according to claim 18, further comprising:

in response to a path from the first inverter circuit to the load being faulty, converting DC to AC on the current output by the second bus; and supplying power to the load.

20. The power supply method according to claim 18, further comprising:

receiving the currents output by the first bus and the second bus;

converting DC to DC on the currents output by the first bus and the second bus; and supplying power to the battery bank.

* * * * *